United States Patent
Bernstorf et al.

(10) Patent No.: US 6,513,561 B1
(45) Date of Patent: Feb. 4, 2003

(54) PNEUMATIC TIRE HAVING MULTIPLE MODULUS BODY CORD TO REDUCE ROLLING RESISTANCE

(75) Inventors: Carolyn W. Bernstorf, Wadsworth, OH (US); Jean-Yea Chen, Hudson, OH (US); Jie Jin, Stow, OH (US); Masahiro Takayama, Kuroiso (JP); Hidetoshi Yokota, Kawasaki (JP)

(73) Assignee: Bridgestone/Firestone North American Tire, LLC, Nashville, TN (US)

(*) Notice: Subject to any disclaimer, the term of this patent is extended or adjusted under 35 U.S.C. 154(b) by 0 days.

(21) Appl. No.: 09/492,205

(22) Filed: Jan. 27, 2000

(51) Int. Cl.$^7$ .................................................. B60C 9/02
(52) U.S. Cl. ..................................... 152/548; 152/555
(58) Field of Search ................................. 152/451, 541, 152/548, 555, 556, 557, 560, 558, 559

(56) References Cited

U.S. PATENT DOCUMENTS

| | | | |
|---|---|---|---|
| 2,253,435 A | 8/1941 | Lang | |
| 3,160,192 A | 12/1964 | Drew | 152/355 |
| 3,253,636 A | * 5/1966 | Travers | 152/543 |
| 3,406,773 A | 10/1968 | Boileau | 152/362 |
| 3,455,100 A | 7/1969 | Sidles et al. | 57/152 |
| 3,540,512 A | 11/1970 | Helmovics, Jr. et al. | 152/359 |
| 3,736,973 A | 6/1973 | Mezzanotte et al. | 152/354 |
| 3,760,858 A | 9/1973 | Grossett | |
| 3,774,663 A | 11/1973 | Montagne | 152/362 |
| 4,024,901 A | 5/1977 | Poque | 152/354 |
| 4,129,162 A | 12/1978 | DeWitt | 152/354 |
| 4,214,620 A | 7/1980 | Mezzanotte | |
| 4,848,431 A | 7/1989 | Kobayashi et al. | 152/548 |
| 4,962,803 A | 10/1990 | Welter | 152/541 |
| 5,160,384 A | 11/1992 | Ueyoko et al. | 152/454 |
| 5,309,971 A | 5/1994 | Baker et al. | 152/541 |
| 5,616,198 A | 4/1997 | Suzuki et al. | 152/556 |
| 5,669,994 A | 9/1997 | Tsuruta | 152/541 |
| 5,730,815 A | 3/1998 | Sakamoto et al. | 152/554 |
| 5,772,811 A | 6/1998 | Ueyoko et al. | 152/540 |
| 5,871,606 A | 2/1999 | Sakamoto et al. | 156/133 |

FOREIGN PATENT DOCUMENTS

| | | |
|---|---|---|
| EP | 0 335 588 A2 | 10/1989 |
| EP | 0 686 514 A2 | 12/1995 |
| EP | 0 959 036 A2 | 11/1999 |
| GB | 2063185 * | 6/1981 |
| JP | 60 080910 | 8/1985 |
| JP | 6-115308 * | 4/1994 |

* cited by examiner

Primary Examiner—Michael W. Ball
Assistant Examiner—Justin Fischer
(74) Attorney, Agent, or Firm—John M. Vasuta; Mike Sand

(57) ABSTRACT

A pneumatic tire includes a body having a plurality of main body cords. The tire includes an upper section above the maximum section width and a lower section below the maximum section width. The modulus of the body cords is configured to be larger in the lower section than in the upper section. This modulus ratio decreases the rolling resistance of the tire. The increased modulus in the lower section is achieved by providing intermediate body cords disposed between the main body cords. In another embodiment, the increased modulus is achieved by changing the material and/or size of the cords in the lower section.

7 Claims, 4 Drawing Sheets

PNEUMATIC TIRE HAVING MULTIPLE MODULUS BODY CORD TO REDUCE ROLLING RESISTANCE

BACKGROUND OF THE INVENTION

1. Technical Field

The present invention generally relates to pneumatic tires and, more particularly, to a pneumatic tire having a multiple modulus body cord that improves the rolling resistance of the tire. Specifically, the present invention is directed to a pneumatic tire having a body cord divided into upper and lower sections wherein the ratio of the modulus of the upper section to the modulus of the lower section is reduced in order to decrease the rolling resistance of the tire. The ratio is reduced by providing additional body cords in the lower section or by increasing the modulus of the cords in the lower section.

2. Background Information

In an inflated and loaded condition, a radial tire is subject to bending moments at the shoulder areas in both the leading and trailing positions of the tire footprint. The strains and stresses created by the moments are directly related to the rolling resistance of the tire. Previous research and studies have focused on reducing the density of strain caused by the bending moments to reduce rolling resistance. One theory to reduce rolling resistance in a pneumatic tire is to increase the eccentricity (ECY) of the tire. Eccentricity is the ratio of belt tension (BT) over body cord tension (BCT). ECY thus equals BT/BCT. In general, a higher ECY will result in lower rolling resistance.

The art has also determined that ECY is related with fundamental stiffness and primarily with radial stiffness ($K_r$). Fundamental stiffness is a group of three parameters measured through a specially designed testing machine. The three parameters are lateral stiffness ($K_s$), radial stiffness ($K_r$), and tangential stiffness ($K_t$). The eccentric stiffness ($E_{cc}$) may be defined as $\text{Trr}(K_r + K_t)$. ECY is inversely proportional to $E_{cc}$. A tire with a lower $K_r$ will thus have a higher ECY and lower rolling resistance.

In the past, rolling resistance requirements have been met by changing the materials or design parameters of the tire. Most tire designs change the tread compound in order to meet the rolling resistance requirements. Changing the tread compound is generally undesirable and the art desires another method for reducing the rolling resistance in tire design.

SUMMARY OF THE INVENTION

In view of the foregoing, an aspect of the present invention is to reduce the rolling resistance of a pneumatic tire by improving the carcass design. In particular, the invention improves the rolling resistance by optimizing the body cord stiffness. The invention optimizes body cord stiffness by dividing the body cord in a tire section into three sections and optimizing the ratio of stiffness of the areas to reduce rolling resistance.

The invention provides a relationship between the body cord tension ratio and the radial stiffness and a relation between radial stiffness and the rolling resistance of the tire.

The invention also provides a pneumatic tire having a multiple modulus body cord tire by applying the concepts of the invention to reduce rolling resistance. The invention is thus achieved by a pneumatic tire including a body having maximum section width. The tire also includes an upper section above the maximum section width and a lower section below the maximum section width. The tire further includes a ply of body cords disposed in the body. The modulus of the body cord ply in the lower section is larger than the modulus of the body cord ply in the upper section.

The invention also provides a pneumatic tire including a body having maximum section width with an upper section above the maximum section width and a lower section below the maximum section width. The tire also includes a plurality of body cords disposed in the body. Each of the body cords having an upper section and a lower section wherein the lower section has a larger modulus than the upper section.

The invention further provides a pneumatic tire including a body having maximum section width with an upper section above the maximum section width and a lower section below the maximum section width. A plurality of body cords are disposed in the body. An intermediate cord is disposed between each pair of body cords in the lower section of the body.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

Similar numbers refer to similar elements throughout the specification.

DESCRIPTION OF THE PREFERRED EMBODIMENTS

Figure 4:
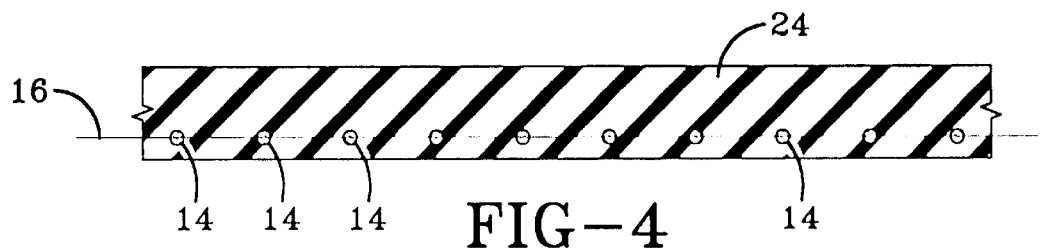
FIG. 4 is a sectional view taken along line 4—4 of FIG. 3.

The tire having reduced rolling resistance is indicated generally by the numeral 10 in the accompanying drawings. Tire 10 includes a ply 12 of body cords 14 that are disposed in a body cord plane 16 (see FIG. 4). Tire 10 also includes a pair of bead rings 18 disposed at the lower ends 20 of tire 10. Ply 12 extends inside each bead ring 18, wraps around the bottom of each bead ring 18, and then turns up outside bead ring 18 to double back on itself. Tire 10 may also include a single or a plurality of belt plies 22. Each of the plies 12 and 22 is disposed in the body 24 of tire 10.

The body cord tension, fundamental stiffness, and rolling resistance of tire 10 are first determined by any of a variety of methods known in the art with a finite element analysis being the preferred method. The invention applies the body cord tension ration (BCTR) concept to design a low energy loss radial tire. The following parameters are first determined to design tire 10:

$$BCTR_{bead} = BCT_{bead}/BCT_{total}$$

$$BCTR_{shldr} = BCT_{shldr}/BCT_{total}.$$

$BCTR_{bead}$ is the body cord tension ratio in the bead section 34. $BCTR_{shldr}$ is the body cord tension ratio in the shoulder area 32. $BCT_{bead}$ is calculated from the maximum section width 28 to the end of turn up when tire 10 is inflated. When multiple body cords 14 are present, multiple body cord tensions in this area are summed. $BCT_{shldr}$ is the summation of body cord tension from the edge of the first belt to maximum section width 28 in an inflated condition. When multiple body cords 14 are present, multiple body cord tension in this area are summed. $BCT_{total}$ is the summation of body cord tension from the center of the tire section to the end of turn up in an inflated condition. Again, when multiple body cords 14 are present, multiple body cord tension in this area are summed.

In accordance with one of the features of the present invention, $BCTR_{bead}$ is closely related with $K_r$ and a tire with higher $BCTR_{bead}$ had a lower $K_r$ value. As discussed above, a lower $K_r$ will reduce rolling resistance. In order to calculate BCTRbead, tire 10 is divided into a tread section 30, shoulder section, 32, and bead section 34. $BCT_{shldr}$, $BCT_{bead}$, and $BCT_{total}$ are then calculated to obtain $BCTR_{bead}$.

Figure 1:
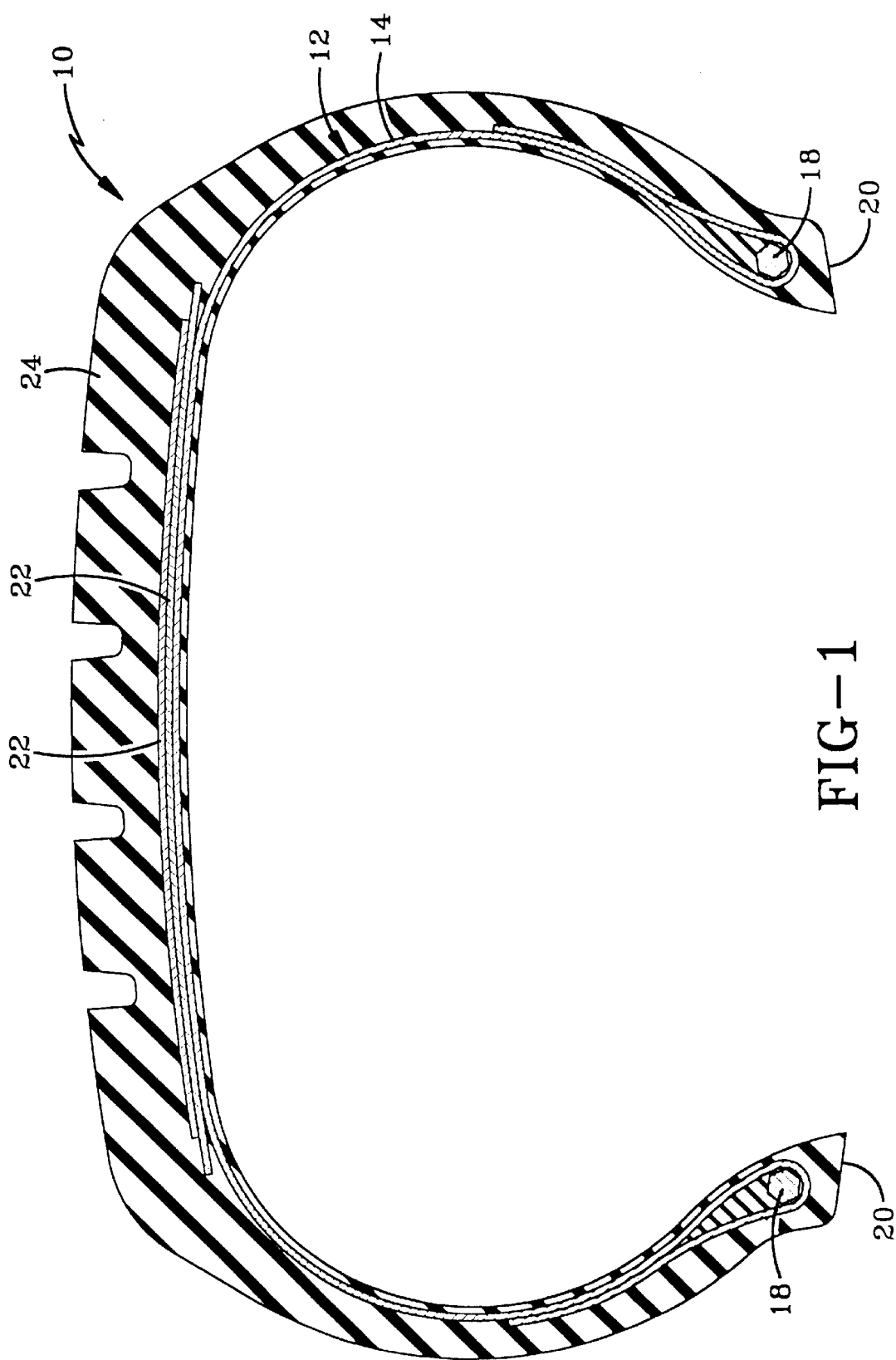
FIG. 1 is a cross sectional view of a pneumatic tire having the improved multiple modulus body cord.
Figure 2:
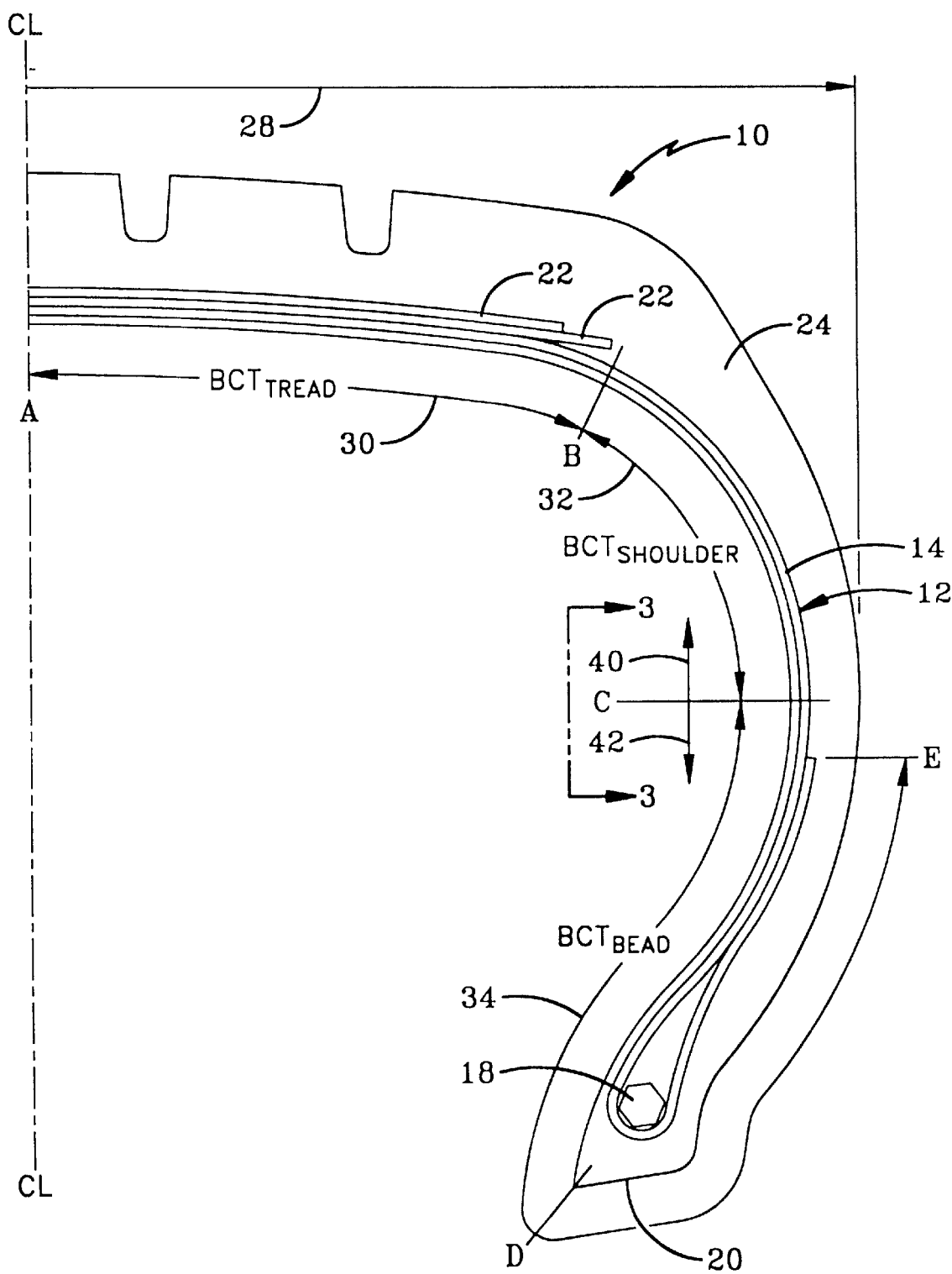
FIG. 2 is an enlarged fragmentary view of the tire of FIG. 1 with the multiple modulus body cord.

In accordance with the features of the present invention, tire 10 includes a multiple modulus body cord 14. The modulus referred to in this application is the modulus of elasticity for cords 14. Ply 12 of body cords 14 is first divided into an upper section 40 (disposed above maximum section width 28 from point C to A in FIG. 2) and a lower section 42 (disposed below maximum section width 28 from point C to E in FIG. 2). Lower section modulus ($M_{lower}$) is the modulus of body cord 14 in lower section 42. Upper section modulus ($M_{upper}$) is the modulus of body cord 14 in upper section 40.

In one example, tires with $M_{lower}$ indexes of 60, 80, 100, and 120 and $M_{upper}/M_{lower}$ at 0.75, 1, 1.33 were reviewed. This review shows that the smaller $M_{upper}/M_{lower}$ ratio has a higher $BCTR_{bead}$ and lower rolling resistance. For instance, if tire 10 has $M_{upper}/M_{lower}$=0.75 and $M_{lower}$ indexed at 80, tire 10 has 7% less radial stiffness, a 4% higher $BCTR_{bead}$ value, and 2% less rolling resistance than a control tire having $M_{upper}/M_{lower}$=1.0.

Figure 3:
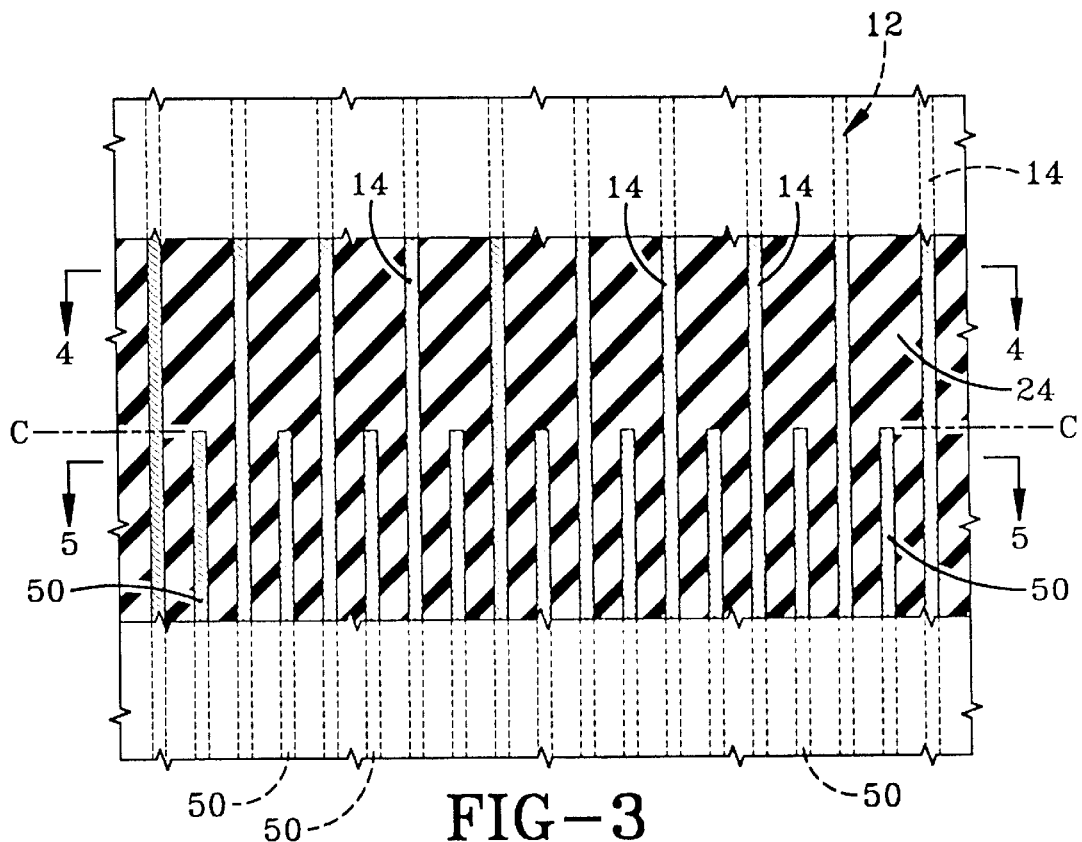
FIG. 3 is an enlarged fragmentary view with portions broken away and in section looking in the direction of arrows 3—3, showing the preferred embodiment for changing the modulus of the body cord in the turn up portion of the tire.
Figure 6:
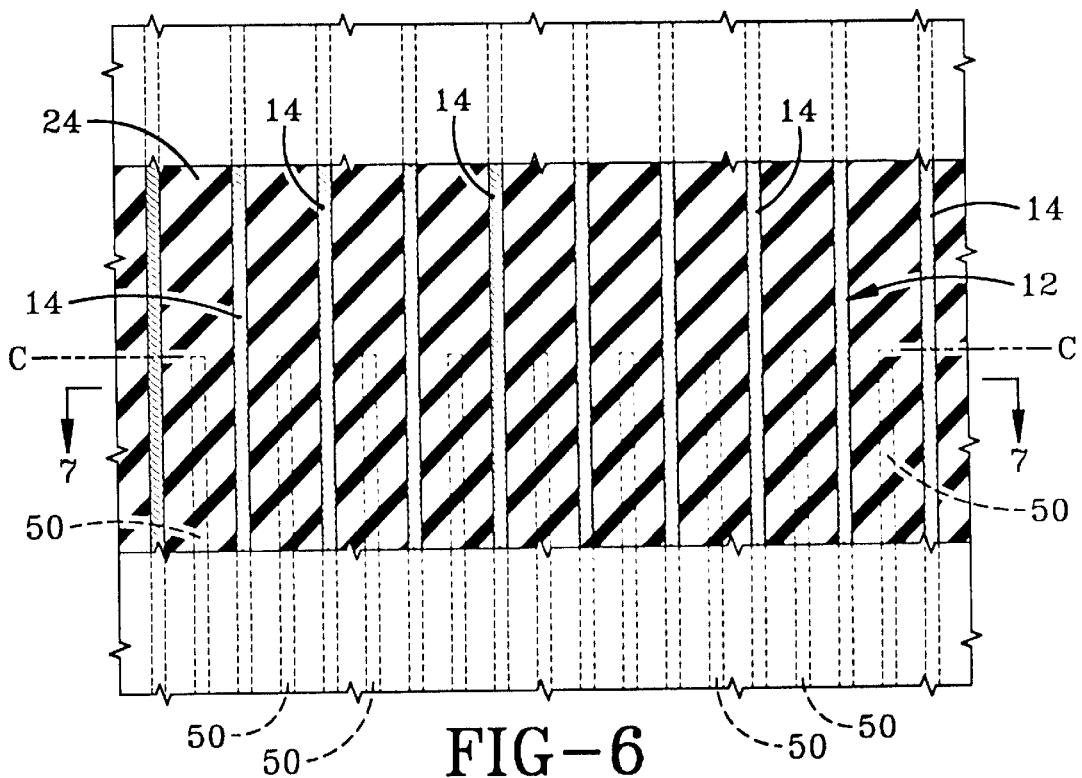
FIG. 6 is a view similar to FIG. 3 showing an alternative embodiment of the invention.
Figure 5:
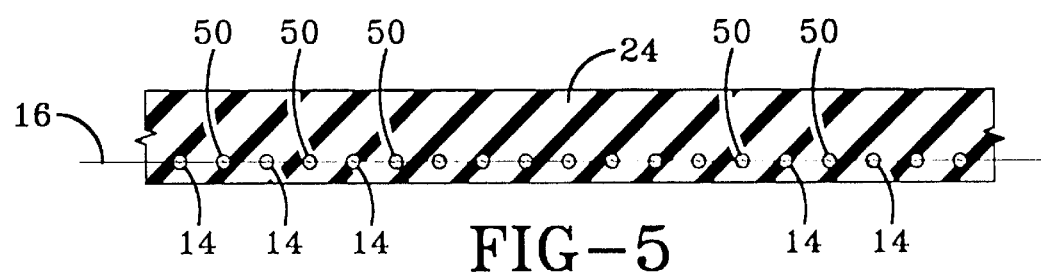
FIG. 5 is a sectional view taken along line 5—5 of FIG. 3.
Figure 7:
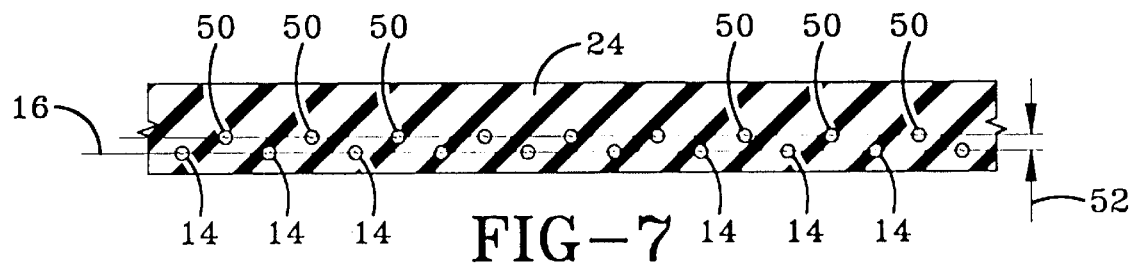
FIG. 7 is a sectional: view taken along line 7—7 of FIG. 6.

The preferred embodiment of tire 10 thus includes an intermediate body cord 50 disposed between each body cord 14 in lower section 42 as depicted in FIG. 3. Intermediate body cords 50 increase the $M_{lower}$ and thus decreases the rolling resistance of tire 10. In the preferred embodiment of the invention, intermediate body cords 50 are disposed in the same body cord plane 16 as body cords 14 as depicted in FIG. 5. Cords 50 are spaced from and substantially parallel to cords 14. An alternative embodiment of the invention is depicted in FIGS. 6 and 7. In the embodiment of tire 10 depicted in FIGS. 6 and 7, intermediate body cords 50 are offset from body cord plane 16 by an offset 52. Cords 50 are also parallel to cords 14 in the alternative embodiment depicted in FIGS. 6 and 7.

Figure 8:
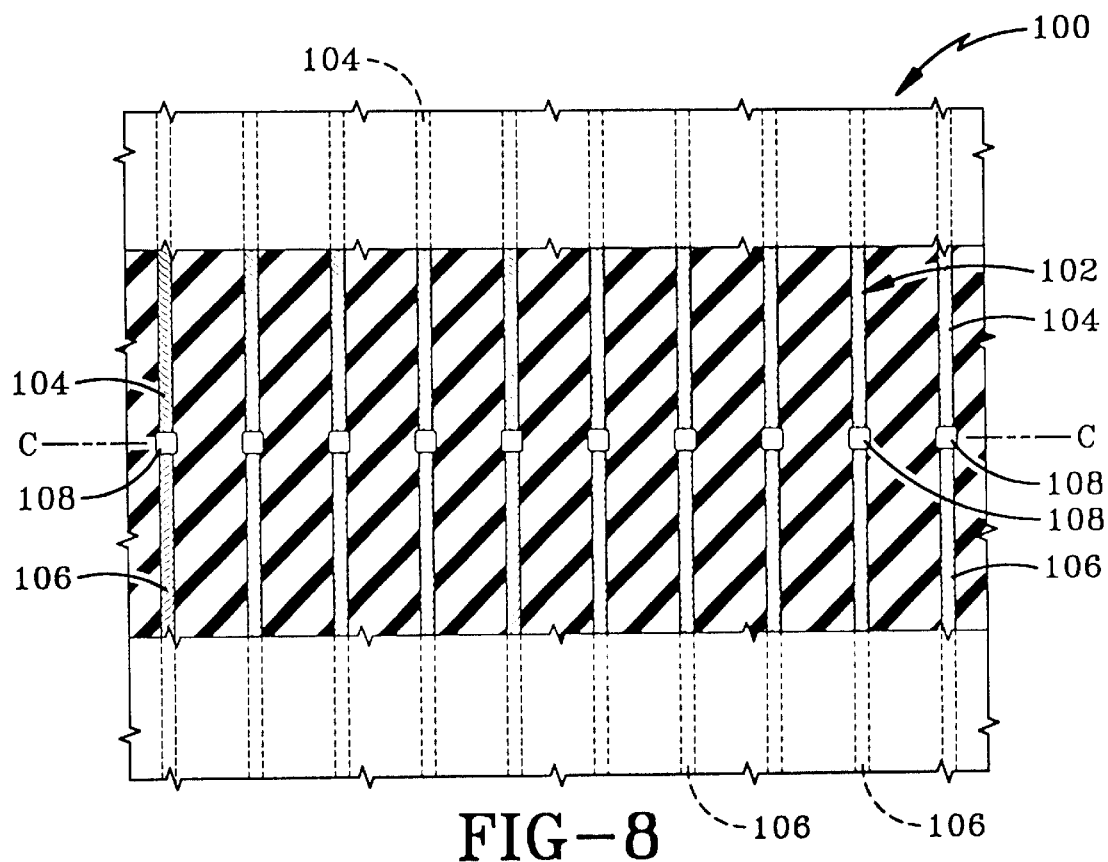
FIG. 8 is a view similar to FIG. 3 showing a second alternative embodiment of the invention.

A second alternative embodiment of the multiple modulus tire is indicated generally by the numeral 100 in FIG. 8. In this embodiment, tire 100 includes main body cords 102 having upper sections 104 and lower sections 106. Lower section 106 have a higher $M_{lower}$ in order to decrease the rolling resistance of tire 100. Upper section 104 is connected to lower section 106 by a connector 108. The modulus in lower section 106 is increased by fabricating lower section 106 from a different material than upper section 104. The lower section 106 may also be formed to have a different cross sectional area or shape than upper section 104.

The invention is not limited to the specific illustrative details that appear above. Other variations, and modifications are equivalent for the stated and illustrated functions without departing from the spirit or scope of the invention as defined by the following claims.

Accordingly, the improved tire with multiple modulus body cord to reduce rolling resistance apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the tire with multiple modulus body cord to reduce rolling resistance is constructed and used, the characteristics of the construction, and the advantageous new and useful results obtained; the new and useful structures, devices, elements, arrangements, parts, and combinations are set forth in the appended claims.

We claim:

1. A pneumatic tire, comprising:
   a body having maximum section width, an upper section above the maximum section width, and a lower section below the maximum section width;
   a ply of body cords disposed in the body;
   the ply of body cords including main body cords and intermediate body cords; the intermediate body cords being disposed in the lower section of the body; the upper section of the body being free of intermediate body cords;
   the modulus of the body cord ply in the lower section being larger than the modulus of the body cord ply in the upper section because the intermediate body cords are disposed in the lower section of the body.

2. The tire of claim 1, wherein the ply of body cords includes a plurality of main body cords; at least one of the main body cords includes first and second cords portions; the first cord portion being disposed in the upper section; the second portion being disposed in the lower section; the modulus of the second portion being higher than the modulus of the first portion.

3. The tire of claim 2, wherein each of the main body cords includes first and second cords portions; the first cord portion being disposed in the upper section; the second portion being disposed in the lower section; the modulus of the second portion being higher than the modulus of the first portion.

4. The tire of claim 1, wherein the intermediate body cords are disposed in the same body cord plane as the main body cords.

5. The tire of claim 4, wherein the intermediate body cords are spaced from and substantially parallel to the main body cords.

6. A pneumatic tire, comprising:

a body having maximum section width, an upper section above the maximum section width, and a lower section below the maximum section width;

a ply of body cords disposed in the body;

the modulus of the body cord ply in the lower section being larger than the modulus of the body cord ply in the upper section;

the body cord ply including main body cords and intermediate body cords disposed in the lower section of the body; and the intermediate body cords being offset from the main body cords.

7. The tire of claim 6, wherein the intermediate body cords are spaced from and substantially parallel to the main body cords.

* * * * *